United States Patent [19]

Idbeis

[11] Patent Number: 5,732,657
[45] Date of Patent: Mar. 31, 1998

[54] AQUARIUM SEA CURRENT GENERATOR

[76] Inventor: Badr Idbeis, 9012 Windwood St., Wichita, Kans. 67226

[21] Appl. No.: 616,560

[22] Filed: Mar. 15, 1996

Related U.S. Application Data

[63] Continuation-in-part of Ser. No. 415,198, Apr. 30, 1995.

[51] Int. Cl.[6] ................................................ A01K 63/00
[52] U.S. Cl. ........................ 119/257; 119/259; 119/269
[58] Field of Search ................................ 119/245, 246, 119/247, 248, 257, 259, 265, 269; 405/79; D30/101–106

[56] References Cited

U.S. PATENT DOCUMENTS

| | | | |
|---|---|---|---|
| 4,160,431 | 7/1979 | Marioni | 119/259 |
| 4,467,483 | 8/1984 | Bastenhof | 4/491 |
| 4,515,500 | 5/1985 | Bastenhof | 405/79 |
| 4,522,535 | 6/1985 | Bastenhof | 405/79 |
| 4,539,719 | 9/1985 | Schuster et al. | 4/491 |
| 4,752,388 | 6/1988 | Ng | 119/259 |
| 4,812,077 | 3/1989 | Raike | 405/79 |
| 5,098,222 | 3/1992 | Robinson | 405/79 |
| 5,226,747 | 7/1993 | Wang et al. | 405/79 |
| 5,285,536 | 2/1994 | Long | 4/491 |
| 5,451,443 | 9/1995 | Wechsler | 119/245 |
| 5,467,739 | 11/1995 | Boschert | 119/247 |
| 5,535,702 | 7/1996 | Idbeis | 119/247 |

*Primary Examiner*—John G. Weiss
*Assistant Examiner*—K. Yong O
*Attorney, Agent, or Firm*—Edward L. Brown, Jr.

[57] ABSTRACT

A sea current generator aquarium including an air tight water chamber located at one end of the aquarium with a first opening into the aquarium extending across the bottom of the chamber. At the opposite end of the aquarium between the end wall and a horizontal divider wall is a second opening into an upper chamber which is open to atmosphere. A constant flow air pump is connected to the water chamber for pumping air in and expelling water out of the first opening into the aquarium and then into the upper chamber. An air valve which cycles open or closed, connects the water chamber to atmosphere and in its vented position, the valve dumps the capacity of the pump and allows the elevated water column in the aquarium and upper chamber to move back into the water chamber through both openings until the valve cycles closed thereby creating a back and forth current of water within the bottom regions of the aquarium.

8 Claims, 1 Drawing Sheet

AQUARIUM SEA CURRENT GENERATOR

This is a CIP of application Ser. No. 08/415,198, filed Apr. 30, 1995.

BACKGROUND OF THE INVENTION

The present invention relates to aquariums and more specifically to a sea current generator in an aquarium which simulates the back and forth currents present in a tropical reef, well below the surface of the water. With these gentle back and forth currents in the bottom of the aquarium, a more realistic environment is provided for the growth of various underwater plants and sea life.

PRIOR ART

To prevent stagnation and formation of algae in an aquarium of this type, small continuous flow pumps have been used to provide water movement within the aquarium. However, the areas of movement have been localized and multiple pumps have been required which still don't provide uniform movement through out the aquarium.

The closest apparatus to a sea current generator would be various types of wave generators which are typically used in pools in water parks to generate a wave of substantial size for surfing and enjoyment of persons in the pool. This type of apparatus generates a sizable surface wave at a frequency simulating the ocean surf. An example of this type of apparatus is illustrated in Robinson, U.S. Pat. No. 5,098,222 wherein a positive water head is released from a chamber into a pool to create a wave which rolls across the surface of the pool. The water discharged in this apparatus is at the top of the tank rather than the bottom and it utilizes a positive head rather than a negative head to create the wave.

The patent to Bastenhof, U.S. Pat. No. 4,522,535, illustrates another way of generating a surface wave in a surfing pool. This system is somewhat the reverse of the present invention in that it blows positive high pressure air into the chamber to create a surface wave through a relatively complex structure which includes numerous valves, a 500 psi air compressor and a storage reservoir for that pressure.

Bastenhof, U.S. Pat. No. 4,467,483, teaches a similar wave generator structure again with the reverse operation to that of the present invention with blowing air pressure into the chamber to create a wave. In the patent to Raike, U.S. Pat. No. 4,812,077, the same reverse operation takes place. The wave is created by a blower with mechanical air valves to charge and vent the alternate chambers, similar to the previously-mentioned Bastenhof patents. This patent, along with the ones mentioned above are rotended to create a surface wave in a pool and have no concern for the subsurface water movement.

Not only do the last three mentioned patents use the expiration stage of the chamber to form the wave but they also require a positive valving for the aspiration cycle which the present invention does not since it merely uses the positive head differential in the aquarium to refill the pressure chamber. The air pump of the present invention requires only a single valve which vents the pressure chamber once the negative head is created in the water chamber. Other types of wave generators are known which include movable vertical walls in a pool which move horizontally back and forth to create a wave. These types of devices require substantial energy to operate and very complex structure to maintain and operate.

BRIEF DESCRIPTION OF THE INVENTION

The sea current generator of the present invention is a CIP of Ser. No. 08/415,198 filed Apr. 30, 1995 and it involves a relatively simple structure which utilizes a pressure chamber at one end of an aquarium. The pressure chamber has a sufficient volume and head differential relative to the overall volume of the aquarium so as to create a gentle back and forth water current action in the aquarium so as to simulate the moving water conditions in a tropical reef. This back and forth current movement stimulates the growth activity of various plants and organism as well as stirring up the waste which collects on the bottom. The current generator includes a pressure chamber positioned in one end of the aquarium having an orifice opening into the aquarium which extends across the bottom of the aquarium from side to side. The aquarium has a second orifice opening which is defined by a horizontal divider which extends across the top of the aquarium. In the return cycle to the pressure chamber, the returning water from the upper chamber flows through the second orifice creating a reverse current down the opposite end wall of the aquarium and across the bottom. The pressure chamber is supplied by constant flow air pump which will displace the water out of the pressure chamber when the control valve for venting the pressure chamber is in a closed position. The control valve, also referred to as vent valve or dump valve, has a capacity far exceeding the output of the pump so that when it is in the open position the air pressure in the chamber is basically atmospheric. The control valve, which is actuated by a rotary solenoid, is controlled by a timer which is set to open the valve when a sufficient negative head has been created in the pressure chamber. The venting of the pressure chamber creates an immediate rush of water from the aquarium into the pressure chamber as the water head and the pressure chamber equalizes. This rushing water into the pressure chamber creates a light current down the end wall as the water from the upper chamber flows across the second orifice and then across the bottom of the aquarium at a similar frequency to the actual current movement in ocean reefs. Once the water level in the pressure chamber is equalized, the timer is set to close the vent valve and the pump again begins to pump down the water from the pressure chamber and again cream a negative pressure head in the pressure chamber. Once that head is again reached, the timer opens the vent valve and the cycle is repeated. This very simplified system involves a single pneumatic valve and air pump and requires only a single phase.

It is therefore the principal object of the present invention to provide a sea current generator which simulates a constant back-and-forth gentle current across bottom regions of an aquarium at a previously determined frequency.

Another object of the present invention is to enhance the filtering function of the aquarium.

A further object of the present invention is to provide a sea current generator of increased efficiency.

DETAILED DESCRIPTION OF THE INVENTION

Figure 1:
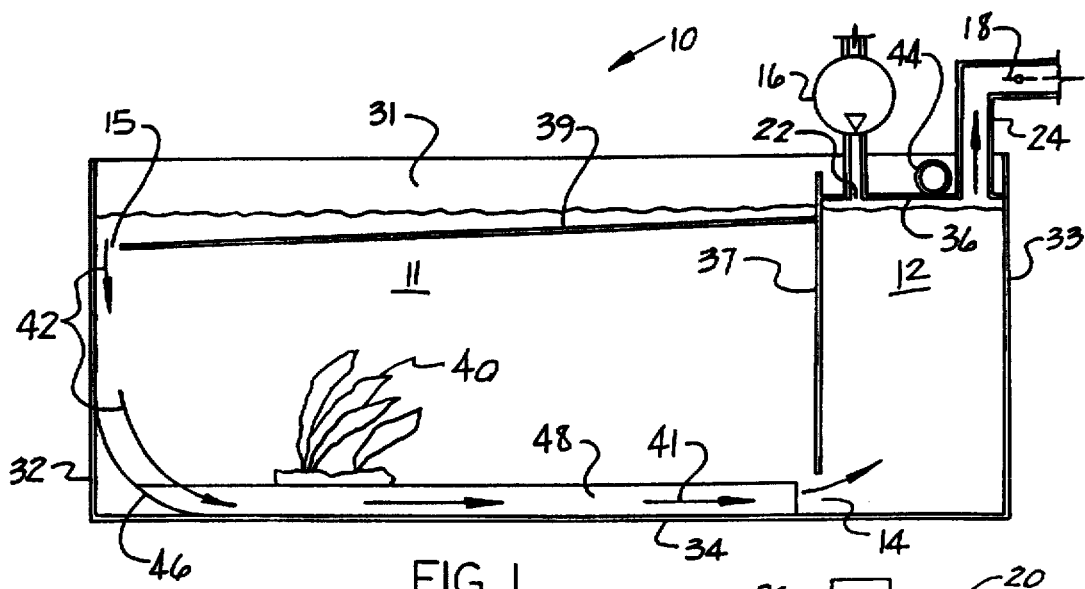
FIG. 1 is symbolic side elevational view of the aquarium and pressure chamber in the fully vented position with the water heads equalized.
Figure 2:
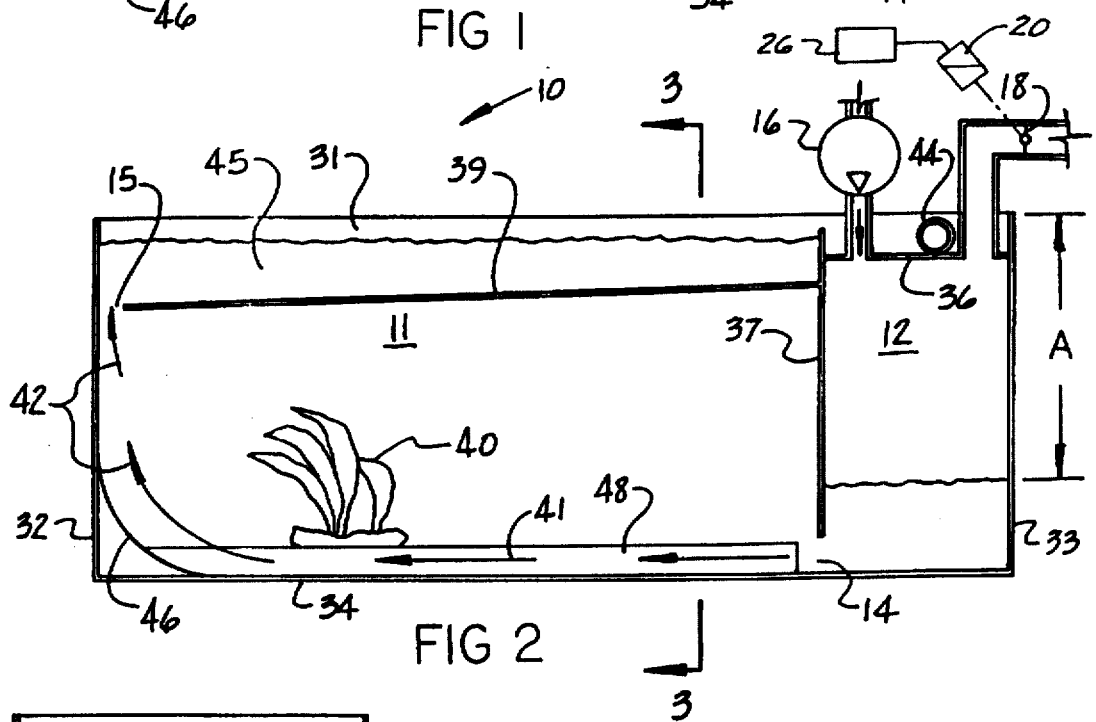
FIG. 2 is a similar side elevational view to FIG. 1 with the water level in the pressure chamber at its optimum negative head.
Figure 3:
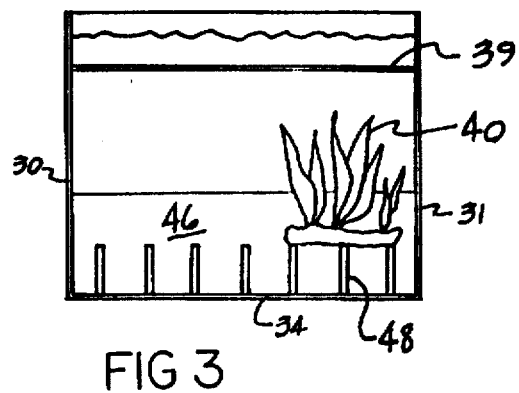
FIG. 3 is a sectional view taken along line 3—3 of FIG. 2.

The aquarium sea current generator of the present invention is generally described by reference numeral 10 and is shown symbolically in FIG. 1 of the drawings. The aquarium 11 includes a pair of side walls 30 and 31, a pair of end walls 32 and 33 and a bottom 34. Located in the right end of the aquarium 11, as seen in FIG. 1 and 2, is a pressure chamber 12 which extends across one end of the aquarium. The chamber 12 is a pressure chamber formed by a top wall 36, side wall 37 along with the side and end walls 30, 31 and 33, respectively, of the aquarium. Extending across the bottom of the chamber 12 is an orifice opening 14 which extends laterally across the aquarium from side to side in uniform height, opening the pressure chamber 12 into the rest of the aquarium 11.

Extending across the top of the aquarium just below the water level is a horizontally positioned divider wall 39 which extends from side wall 37 just short of the left side of the aquarium, as seen in FIG. 1, the end of which defines an orifice opening 15. Connected to the pressure chamber 12 is a low pressure blower or air pump 16 which connects to the chamber through port 22. Also connected to chamber 12 is a large diameter duct 24 which includes a butterfly valve 18 for venting the pressure chamber. The CFM capacity of the valve 18 far exceeds that of pump 16. The rate of air flow through duct 24 can be adjusted by the addition of a variable orifice not shown in the drawing. Valve 18 is a conventional butterfly type valve actuated by a rotatory type solenoid 20 which in turn is energized by a control timer 26 symbolically shown. Other types of valves with linear actuators could also be used.

The pressure chamber 12 can be separately constructed and placed in the end of a conventional aquarium or it can be constructed as an integral part of the aquarium utilizing the existing walls and bottom of the aquarium with the added divider wall 39, top wall 36 and side wall 37. The location of the air port 22 for the pump 16 and the vent 24 only require that they preferably be positioned above the maximum water level in the pressure chamber at all times.

OPERATION

In the inoperative position the water level in chambers 11 and 12 will equalize as shown in FIG. 1. Horizontal divider wall 39 is positioned just below the water level and slightly sloping toward orifice opening 15.

When the current generator 10 is initially started, the pump 16 begins to pump air into chamber 12 while butterfly valve 18 is in its closed position, as seen in FIG. 2. As the water level is pumped down in chamber 12, the water flows from chamber 12 into the aquarium 11 as indicated by the arrows 41 in FIG. 2 and out of orifice opening 15 into the upper chamber 45. When the water level in chamber 12 reaches its optimum negative head A, the butterfly valve 18 is opened through an electrical signal generated by a timer 26 which fires solenoid 20. Since the venting capacity of duct 24 far exceeds the capacity of pump 16 the air pressure in chamber 12 drops to substantially atmospheric. The negative pressure head in chamber 12 causes the water in upper chamber 45 to rush into aquarium 11 through orifice opening 15. This flow creates a current down the side wall 32, as indicated by arrows 42, across the transition area 46 and along the bottom regions between the vertical slats 48. This current sweeps any solids that have collected on the bottom 34 of the aquarium. Positioned on top of slats 48 are plants 40 attached to rocks which do not interrupt the current across the bottom. Based on the rate of airflow through butterfly valve 18, a control timer 26 will de-energize solenoid 20 approximate the time the water levels in the pressure chamber 12 and aquarium 11 equalize, as illustrated in FIG. 1. As solenoid 20 is de-energized, butterfly valve 18 closes and positive pressure is created in chamber 12 forcing the water level downwardly and back into aquarium 11 and upper chamber 45. This back and forth current in the lower regions of the aquarium creates a beneficial action on the plant life and coral 40 in the aquarium so as to assimilate the sea currents in a reef. The amplitude or volume of the water moved and the frequency of the current can be adjusted by the settings of the timer 26 and the flow rate in the duct 24. The comparative volumes of the chamber 12 to the aquarium 11 can vary; however, an optimum ratio of ranges would be a pressure chamber between 10 and 25 per cent by volume of the aquarium. The velocity of the current is normally greater as the water returns to the pressure chamber 12 from that of expelling water from the chamber 12. However, both can be varied to what ever is desked. The frequency of the reversing currents can be adjusted also. The size of orifice openings 14 and 15 which extend across the entire width of the aquarium are relatively large so that the time intervals for the return stroke into chamber 12 is relatively unchanged with varying heads of water. The velocities created in openings 14 and 15 are sufficient to create movement across the full length of the aquarium from end to end. Both opening sizes can be made to be adjustable so that the current's velocity can be adjusted to be faster or slower.

The timing control 26 can be set to cycle the valve 18 open and closed for a range of time intervals. A typical time interval is one that simulates the actual current of a reef. Typically a full cycle is about 40 seconds, 20 seconds with the valve 18 closed for the first phase. The flow of air from pump 16 can be adjusted so as not to lower the water level in chamber 12 below bottom opening 14 in 20 seconds. In the second phase of the cycle, the valve 18 is opened. The rate of water returning into chamber 12 can be regulated by adjusting the rate of air escape from duct 24. This portion of the second phase requires about 10 seconds, the remaining 10 seconds of the second phase would allow a call phase before the valve 18 is again closed and phase one starts again.

The sea current generator is relatively simple in design and operation and has sufficient flexibility for adjusting velocities of the current throughout the aquarium to achieve the optimum aquarium environment for flora and fauna.

It is to be understood that while certain forms of the present invention have been illustrated and described herein, it is not to be limited to the specific forms or arrangement of parts described and shown.

I claim:

1. An aquarium having two side walls, a bottom and two end walls, a sea current generator comprising:

a horizontal divider wall positioned in the upper area of the aquarium defining an upper chamber joined to the aquarium by a first orifice opening between an end wall and the divider wall;

an airtight water chamber located in the opposite end of the aquarium including a second orifice opening into the aquarium extending substantially across the bottom thereof, the water chamber including a constant flow air pump means connected to the water chamber for pumping air into said chamber and expelling water from the second orifice opening and air valve means in a duct connecting the water chamber to atmosphere and actuating means for cycling the air valve from an open to a closed position whereby in its open position the air valve and duct exceed the capacity of the constant flow air pump and allows the elevated water column in the aquarium to move back into the water chamber through the said orifice openings thereby creating a back-and-forth current of water within the bottom regions of the aquarium.

2. An aquarium as set forth in claim 1, including adjustable timing means which signals the actuating means to open and close the valve means to adjust the frequency of the back-and-forth current within the aquarium.

3. An aquarium as set forth in claim 1 wherein the orifice openings are sufficiently sized so that as the water is moved through the openings, there is a gentle water current extending the full length of the aquarium.

4. An aquarium with side walls and a bottom including a sea current generator comprising:

a horizontal divider wall positioned in the upper area of the aquarium defining an upper chamber joined to the aquarium by a first orifice opening between an end wall and the divider wall;

an airtight water chamber positioned in the opposite end of the aquarium;

a second orifice opening in the water chamber located at the bottom of the aquarium and extending substantially across the aquarium;

an air pump means connected to said water chamber for pumping air into said chamber and expelling water therefrom;

an air valve positioned in a duct connecting the water chamber to atmosphere;

actuating means for cycling the air valve from an open to a closed position which allows the elevated water column in the aquarium to move back into the water chamber through said orifice openings, creating a back-and-forth current of water in the aquarium.

5. An aquarium as set forth in claim 1 including a curved transition surface joining the end wall with the bottom at the aquarium end opposite the water chamber.

6. An aquarium as set forth in claim 1 wherein the horizontal divider wall is sloped toward the first orifice opening.

7. An aquarium as set forth in claim 1 including a plurality of vertical slats in the aquarium extending parallel to the currents for supporting rocks and plants which permits the currents along the bottom to keep the sediments suspended in the water so they may be removed by the aquarium filter.

8. An aquarium having side walls, end walls and a bottom including a sea current generator means therein which creates a back-and-forth current in the bottom regions of the aquarium and a plurality of vertical slats in the bottom of the aquarium, said plurality of vertical slats extending longitudinally which support rocks and plants in the aquarium, said back-and-forth current produced by sea current generator moving generally parallel with the vertical slats and in between the vertical slats such that the currents keep the sediments suspended in the water until filtered.

* * * * *